United States Patent
Yang et al.

(10) Patent No.: US 9,452,686 B2
(45) Date of Patent: *Sep. 27, 2016

(54) COOLING MEMBER OF NOVEL STRUCTURE AND BATTERY MODULE EMPLOYED WITH THE SAME

(71) Applicant: LG CHEM, LTD., Seoul (KR)

(72) Inventors: JaeHun Yang, Daejeon (KR); Jong Moon Yoon, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,297

(22) Filed: Oct. 19, 2012

(65) Prior Publication Data

US 2013/0040175 A1 Feb. 14, 2013

Related U.S. Application Data (63) Continuation of application No. PCT/KR2011/003503, filed on May 12, 2011.

(30) Foreign Application Priority Data

May 18, 2010 (KR) ................. 10-2010-0046201

(51) Int. Cl.
*H01M 6/50* (2006.01)
*H01M 10/50* (2006.01)
(Continued)

(52) U.S. Cl.
CPC ........ *B60L 11/1879* (2013.01); *B60L 11/1874* (2013.01); *H01M 6/50* (2013.01);
(Continued)

(58) Field of Classification Search
USPC ........................................... 429/120
See application file for complete search history.

(56) References Cited

U.S. PATENT DOCUMENTS 4,562,125 A * 12/1985 Davis ............... H01M 2/32
 180/68.5
5,756,227 A * 5/1998 Suzuki ............... F28F 3/02
 429/120

(Continued)

FOREIGN PATENT DOCUMENTS

JP 8-148187 A 6/1996
JP 2004-103258 A 4/2004

(Continued)

OTHER PUBLICATIONS

International Search Report issued in PCT/KR2011/003503, mailed Feb. 6, 2012.

(Continued)

*Primary Examiner* — Scott J Chmielecki
(74) *Attorney, Agent, or Firm* — Birch, Stewart, Kolasch & Birch, LLP (57) ABSTRACT

Disclosed herein is a cooling member mounted between battery cells to remove heat generated from the battery cells during charge and discharge of the battery cells, wherein the cooling member includes a plate-shaped cooling fin configured to have a structure in which two battery cell contact portions disposed in tight contact with outer sides of the battery cells in a state in which the cooling fin is disposed between the respective battery cells are continuously formed in a horizontal direction (a lateral direction) and a coolant conduit configured to have a hollow structure in which a coolant flows, the coolant conduit thermally contacting the cooling fin, the coolant conduit being located at the outside of an electrode assembly receiving part of each of the battery cells when the cooling fin is disposed between the battery cells.

18 Claims, 7 Drawing Sheets

(51) Int. Cl.
*B60L 11/18* (2006.01)
*H01M 10/61* (2014.01)
*H01M 10/60* (2014.01)
*H01M 10/617* (2014.01)
*H01M 10/647* (2014.01)
*H01M 10/6556* (2014.01)
*H01M 10/6551* (2014.01)
*H01M 10/6567* (2014.01)
*H01M 10/6555* (2014.01)
*H01M 10/613* (2014.01)

(52) U.S. Cl.
CPC ......... *H01M 6/5038* (2013.01); *H01M 10/60* (2015.04); *H01M 10/61* (2015.04); *H01M 10/613* (2015.04); *H01M 10/617* (2015.04); *H01M 10/647* (2015.04); *H01M 10/6551* (2015.04); *H01M 10/6555* (2015.04); *H01M 10/6556* (2015.04); *H01M 10/6567* (2015.04); *B60L 2240/545* (2013.01); *Y02T 10/7005* (2013.01); *Y02T 10/705* (2013.01)

(56) References Cited

U.S. PATENT DOCUMENTS

| | | | | |
|---|---|---|---|---|
| 7,572,549 | B2* | 8/2009 | Wegner | H01M 2/0212 165/43 |
| 2005/0089750 | A1* | 4/2005 | Ng | H01M 2/0242 429/120 |
| 2005/0100783 | A1* | 5/2005 | Ro | H01M 2/1061 429/159 |
| 2005/0231158 | A1* | 10/2005 | Higashino | H01M 2/1077 320/112 |
| 2007/0207377 | A1* | 9/2007 | Han | H01M 2/021 429/162 |
| 2008/0187820 | A1* | 8/2008 | Nakano | H01G 2/08 429/83 |
| 2009/0186265 | A1* | 7/2009 | Koetting | H01M 6/5038 429/120 |
| 2009/0253026 | A1 | 10/2009 | Gaben | |
| 2009/0255109 | A1* | 10/2009 | Weber | H01M 2/14 29/623.2 |
| 2009/0286138 | A1* | 11/2009 | Shimamori | H01M 2/0257 429/53 |
| 2010/0275619 | A1* | 11/2010 | Koetting | H01M 10/613 62/79 |
| 2010/0276132 | A1* | 11/2010 | Payne | F28D 15/0266 165/169 |
| 2010/0279152 | A1* | 11/2010 | Payne | H01M 10/486 429/50 |
| 2010/0279153 | A1* | 11/2010 | Payne | H01M 10/486 429/50 |
| 2010/0279154 | A1* | 11/2010 | Koetting | H01M 10/425 429/50 |
| 2011/0027640 | A1* | 2/2011 | Gadawski | H01M 2/0212 429/120 |
| 2011/0206964 | A1* | 8/2011 | Odumodu | H01M 10/6557 429/120 |
| 2011/0212355 | A1* | 9/2011 | Essinger | H01M 2/1016 429/120 |
| 2011/0269008 | A1* | 11/2011 | Houchin-Miller | B60L 11/1874 429/120 |
| 2011/0293982 | A1* | 12/2011 | Martz | H01M 10/5004 429/120 |
| 2012/0009455 | A1* | 1/2012 | Yoon | H01M 10/6552 429/120 |
| 2012/0009457 | A1* | 1/2012 | Lee | B60L 11/1874 429/120 |
| 2012/0043754 | A1* | 2/2012 | Gadawski | F16L 37/098 285/189 |
| 2012/0045681 | A1* | 2/2012 | Klaus | H01M 10/0525 429/120 |
| 2012/0094165 | A1* | 4/2012 | Valencia, Jr. | H01M 10/0525 429/120 |
| 2012/0107649 | A1* | 5/2012 | Anderson | H01M 10/5004 429/50 |
| 2012/0301771 | A1* | 11/2012 | Moser | H01M 10/613 429/120 |
| 2013/0115489 | A1* | 5/2013 | Krause | H01M 10/613 429/71 |

FOREIGN PATENT DOCUMENTS

| | | |
|---|---|---|
| JP | 2006-73461 A | 3/2006 |
| JP | 2009-9889 A | 1/2009 |
| JP | 2009-193961 A | 8/2009 |
| JP | 2010-40345 A | 2/2010 |
| KR | 10-0867655 B1 | 11/2008 |
| KR | 10-2009-0107443 A | 10/2009 |
| KR | 10-2010-0041452 A | 4/2010 |
| KR | 10-2011-0011068 A | 2/2011 |
| WO | WO 2009/140199 A2 | 11/2009 |

OTHER PUBLICATIONS

Chinese Office Action mailed Feb. 28, 2015, for Chinese Application No. 201180024474.4.

* cited by examiner

COOLING MEMBER OF NOVEL STRUCTURE AND BATTERY MODULE EMPLOYED WITH THE SAME

CROSS REFERENCE TO RELATED APPLICATIONS

This application is a Continuation of PCT International Application No. PCT/KR2011/003503 filed on May 12, 2011, which claims priority under 35 U.S.C. 119(a) to Application No. 10-2010-0046201 filed in Republic of Korea on May 18, 2010, all of which are hereby expressly incorporated by reference into the present application.

TECHNICAL FIELD

The present invention relates to a cooling member of a novel structure and a battery module including the same, and, more particularly, to a cooling member mounted between battery cells to remove heat generated from the battery cells during charge and discharge of the battery cells, wherein the cooling member includes a plate-shaped cooling fin configured to have a structure in which two battery cell contact portions disposed in tight contact with outer sides of the battery cells in a state in which the cooling fin is disposed between the respective battery cells are continuously formed in a horizontal direction (a lateral direction) and a coolant conduit configured to have a hollow structure in which a coolant flows, the coolant conduit thermally contacting the cooling fin, the coolant conduit being located at the outside of an electrode assembly receiving part of each of the battery cells when the cooling fin is disposed between the battery cells, and a battery module including the same.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a middle or large-sized battery pack for vehicles, which is a high-power, large-capacity battery including a plurality of middle or large-sized battery modules, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge to constitute a unit module, and a plurality of unit modules is stacked to constitute a battery module. The battery cartridge increases the mechanical strength of the battery cells; however, the battery cartridge also increases the overall size of the battery module.

Also, coolant channels are defined between the stacked battery cells or between the stacked battery modules so that heat accumulating between the stacked battery cells or between the stacked battery modules is effectively removed.

In particular, in a case in which the cooling structure is based on a water cooling type cooling system, a plurality of coolant channels is defined between the battery cells or between the battery modules with the result that it is very difficult to design the cooling structure. In addition, if a cooling member or a thermal conduction member is mounted to a specific region of the batter pack to constitute the cooling structure, overall size of the battery pack is increased.

Figure 1:
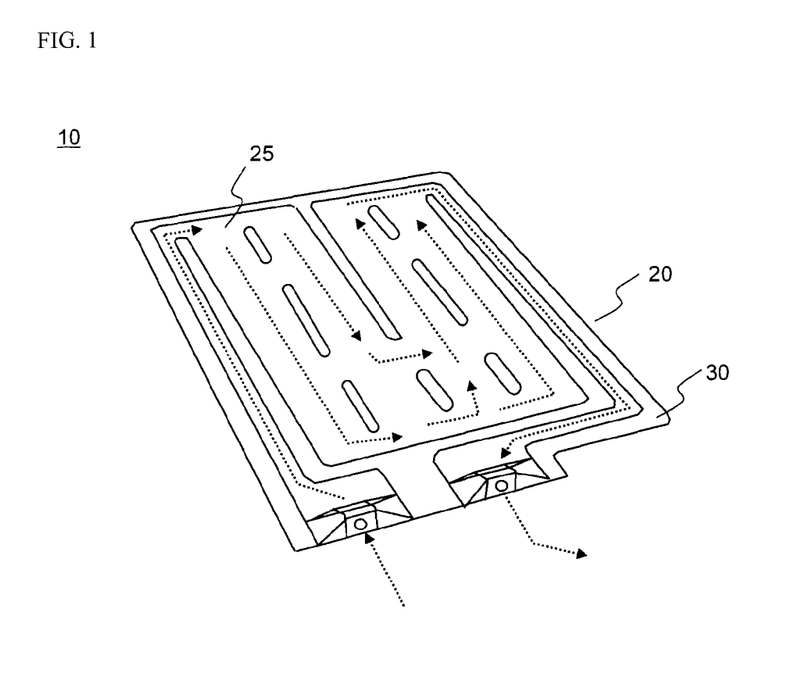
FIG. 1 is a typical view showing an illustrative cooling member.

In connection with this case, a cooling member 10 having a structure as shown in FIG. 1 may be considered as the water cooling type cooling member disposed between the battery cells of the battery module. Specifically, the cooling member 10 of FIG. 1 includes a pair of metal sheets 20. Outer edges 30 of the metal sheets 20 are sealed in a state in which coolant channels 25 are continuously formed at the insides of the metal sheets 20.

However, the mechanical strength of the cooling member 10 is not structurally low with the result that, when the thickness of the battery cells is increased in the stacked direction of the battery cells, the coolant channels 25 formed so as to be in tight contact with the battery cells may be clogged or the sealed portions of the cooling member 10 may be separated from each other. Consequently, coolant tightness and cooling efficiency are lowered.

Furthermore, it is necessary for the entirety of the cooling member 10 to have corrosion resistance with the result that the manufacturing costs of the cooling member 10 are increased. In addition, the coolant channel 25 included in the cooling member disposed between the respective battery cells has a coolant inlet port and a coolant outlet port with the result that the structure of the cooling member 10 is complicated.

Consequently, there is a high necessity for a cooling member which effectively prevents leakage of a coolant, ensures durable reliability for a long time, and can be manufactured through a simple process and at low costs, and a battery module of excellent safety using the cooling member.

DISCLOSURE

Technical Problem

Therefore, the present invention has been made to solve the above problems, and it is an object of the present invention to provide a cooling member configured to have a structure in which a coolant conduit is coupled to the outside of a cooling fin.

It is another object of the present invention to provide a battery module configured to have a structure in which a coolant conduit is disposed along the outer edge of an electrode assembly receiving part in correspondence to the outer edges of two or more electrode assembly contact portions, and therefore, manufacturing efficiency is improved while the manufacturing costs are reduced, and leakage of a coolant is prevented.

Technical Solution

In accordance with one aspect of the present invention, the above and other objects can be accomplished by the provision of a cooling member mounted between battery cells to remove heat generated from the battery cells during charge and discharge of the battery cells, wherein the cooling member includes a plate-shaped cooling fin configured to have a structure in which two battery cell contact portions disposed in tight contact with outer sides of the battery cells in a state in which the cooling fin is disposed between the respective battery cells are continuously formed in a horizontal direction (a lateral direction) and a coolant conduit configured to have a hollow structure in which a coolant flows, the coolant conduit thermally contacting the cooling fin, the coolant conduit being located at the outside of an electrode assembly receiving part of each of the battery cells when the cooling fin is disposed between the battery cells.

The coolant conduit is fitted in the cooling fin along the outside of the electrode assembly receiving part. Consequently, it is possible to effectively prevent leakage of the coolant, as previously described. Also, it is possible to prevent the coolant conduit from being clogged or damaged due to stacking of the battery cells. In addition, it is possible to maintain the shape of the cooling member during the use of the cooling member, thereby achieving excellent cooling design reliability.

Also, corrosion resistance to the coolant is required only with respect to the coolant conduit. That is, it is not necessary to make the cooling fin of a corrosion-resistant material. Consequently, the manufacturing costs of the cooling member are decreased.

In addition, the cooling member is disposed between the battery cells arranged side by side in the horizontal direction. To this end, the coolant conduit is bent in various forms and is fitted in the cooling fin. Consequently, the number of coolant inlet ports and coolant outlet ports is greatly reduced, thereby manufacturing the battery module so that the battery module has a very compact structure and improving assembly process efficiency of the cooling member.

Preferably, each of the battery cells is a plate-shaped secondary battery, which has a small thickness and a relatively large width and length so that the total size of the battery module is minimized when the battery cells are stacked to constitute the battery module. A preferred example of such a plate-shaped secondary battery may be a prismatic battery cell or a pouch-shaped battery cell. Preferably, the plate-shaped secondary battery is a pouch-shaped battery cell configured to have a structure in which an electrode assembly of a cathode/separator/anode structure is mounted in an electrode assembly receiving part formed at a battery case formed of a laminate sheet comprising a resin layer and a metal layer, and a sealed portion ('outer edge sealed portion'), sealed by thermal welding, is formed at the outer edge of the an electrode assembly receiving part.

The material for the cooling fin is not particularly restricted so long as the cooling fin is formed of a material exhibiting high thermal conductivity to improve cooling efficiency. For example, the cooling fin may be formed of a metallic material exhibiting high thermal conductivity.

The cooling fin is preferably configured to have a structure in which a pair of metal sheets is coupled to each other.

The coolant conduit is formed of a corrosion-resistant material. Consequently, the coolant conduit is prevented from being corroded by the coolant when the coolant flows in the coolant conduit.

In a preferred example, the coolant conduit may be configured so that at least a portion of the coolant conduit is bent so as to correspond to the shape of the outer edges of the battery cell contact portions. When the cooling member is disposed between the battery cells, therefore, at least a portion of the coolant conduit is positioned adjacent to the battery cell contact portions, thereby improving cooling efficiency. Also, it is possible to design the cooling member using a coolant conduit with respect to two or more battery cells arranged side by side in the horizontal direction, and therefore, it is possible to easily manufacture a battery module having a more compact structure through a simple manufacturing process.

In the above structure, the coolant conduit may be variously formed so as to correspond to the shape of the electrode assembly receiving part of each of the battery cells. For example, when the electrode assembly receiving part of each of the battery cells is formed in a quadrangular shape in plan, (i) the coolant conduit may be bent in the shape of 'ㄷ' corresponding to the outer edges of the battery cell contact portions in plan, or (ii) the coolant conduit may be bent in the shape of ㄹ extending between the battery cell contact portions in plan.

Preferably, the coolant conduit is bent so as to be disposed in tight contact with the outer edge of the electrode assembly receiving part.

In this structure, the coolant conduit can be disposed in tight contact with the outer edge of the electrode assembly receiving part when the cooling member is disposed between the battery cells, thereby maximizing heat dissipation through thermal conduction. Also, the cooling member is effectively fixed by the coolant conduit bent along the outer edge of the electrode assembly receiving part to increase supporting force of the battery cells. Consequently, it is not necessary to use additional members to fix the battery cells or it is possible to minimize the use of such additional members.

The coolant conduit may be configured, for example, so that a coolant inlet port and a coolant outlet port of the coolant conduit are formed at one side of the cooling fin side by side or at opposite sides of the cooling fin.

An example of the structure in which the coolant inlet port and the coolant outlet port of the coolant conduit are formed at one side of the cooling fin side by side is a structure in which the coolant conduit is coolant conduit is bent in the shape of 'ㄷ' corresponding to the outer edges of the battery cell contact portions in plan. Also, an example of the structure in which the coolant inlet port and the coolant outlet port of the coolant conduit are formed at opposite sides of the cooling fin is a structure in which the coolant conduit is bent in the shape of 'ㄹ' in plan.

Meanwhile, in the structure in which the coolant inlet port and the coolant outlet port of the coolant conduit are formed at opposite sides of the cooling fin, the coolant conduit extends along three sides of the electrode assembly receiving part. Consequently, the structure in which the coolant inlet port and the coolant outlet port of the coolant conduit are formed at opposite sides of the cooling fin provides higher cooling efficiency than the structure in which the coolant inlet port and the coolant outlet port of the coolant conduit are formed at one side of the cooling fin side by side.

Meanwhile, the coolant conduit may be coupled to the cooling fin by welding, preferably blazing.

In another preferred example, the cooling fin may be configured to have a structure in which a pair of metal sheets is coupled to each other, and the coolant conduit may be coupled to the cooling fin in a state in which the coolant conduit is disposed between the metal sheets.

In the cooling member with the above structure, the coolant conduit, formed of a corrosion-resistant material, is coupled to the cooling fin, and therefore, it is possible to configure the cooling member so that the cooling member is more compact while minimizing a problem of leakage of the coolant.

Meanwhile, the cooling fin may be provided with one or more depressed coupling portions configured to be coupled to a battery module case or a battery cell mounting frame. Preferably, the depressed coupling portions are formed between the battery cell contact portions. Consequently, it is possible to easily mount the cooling member to the battery module or the battery cells without using additional members to fix the cooling member.

Meanwhile, the coolant is not particularly restricted so long as the coolant exhibits high cooling efficiency while easily flowing in the coolant conduit. For example, the coolant may be water, which contains high latent heat, thereby maximizing cooling efficiency.

In accordance with another aspect of the present invention, there is provided a battery module configured to have a structure in which two or more battery cells are arranged in a horizontal direction (a lateral direction) and one or more battery cells are arranged in a vertical direction (a thickness direction) with respect to the battery cells arranged in the horizontal direction, wherein the cooling member with the above-stated construction is disposed between the battery cells arranged in the vertical direction.

In the battery module according to the present invention, therefore, it is possible to greatly improve design reliability and cooling efficiency by the provision of a cooling fin and a coolant conduit of the cooling member and to configure the battery module so that the battery module has a compact structure.

In a preferred example, the battery cells arranged in the horizontal direction may be mounted in a frame member, the cooling member may be provided with one or more depressed coupling portions to be coupled to the frame member, and the frame member may be provided with one or more protruding coupling portions corresponding to the depressed coupling portions. Consequently, the cooling member and the frame member can be mechanically coupled to each other through engagement between the depressed coupling portions and the protruding coupling portions.

The coolant conduit may be configured so that a coolant inlet port and a coolant outlet port of the coolant conduit are formed, preferably, at a region corresponding to electrode terminals of each of the battery cells. Consequently, it is possible to maximize cooling efficiency with respect to the electrode terminals, which are regions of each of the battery cells from which a large amount of heat is generated.

According to circumstances, the coolant conduit may be configured so that the coolant inlet port and the coolant outlet port of the coolant conduit are formed at a region opposite to electrode terminals of each of the battery cells so that the coolant inlet port and the coolant outlet port do not structurally interfere with electrode leads of each of the battery cells.

The battery module according to the present invention includes a plurality of battery cells in order to provide high power and large capacity. Consequently, the battery module is preferably used as a power source for an electric vehicle, a hybrid electric vehicle, a plug-in hybrid electric vehicle, or a power storage device in which high-temperature heat generated during charge and discharge of the battery cells is a serious safety concern.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 2:
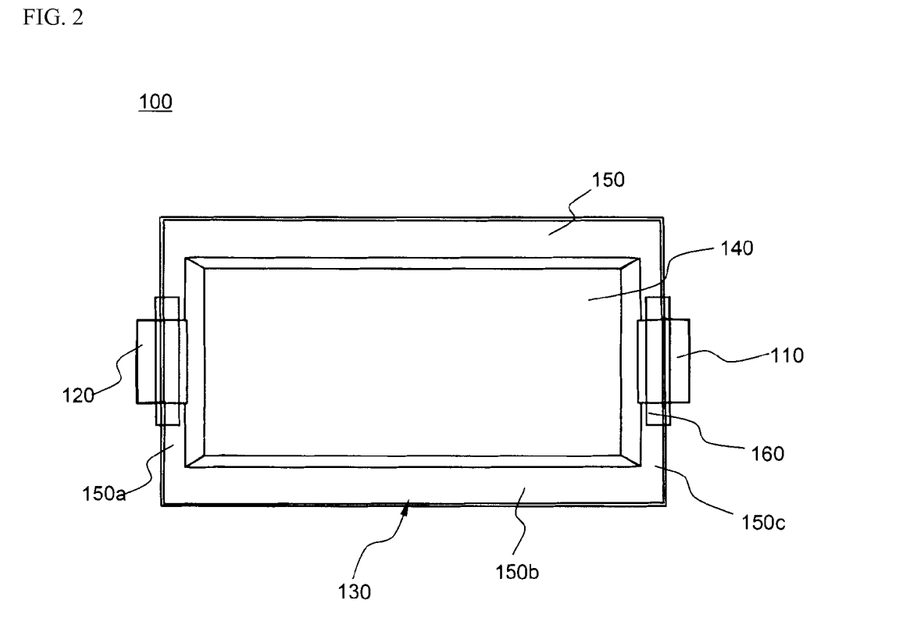
FIG. 2 is a perspective view showing an illustrative plate-shaped battery cell.

FIG. 2 is a perspective view typically showing an illustrative plate-shaped battery cell mounted in a battery module according to the present invention.

Referring to FIG. 2, a plate-shaped battery cell 100 is configured to have a structure in which two electrode leads 110 and 120 protrude from the upper end and the lower end of a battery case 130 in a state in which electrode leads 110 and 120 are opposite to each other.

The battery case 130 is formed of a laminate sheet including a metal layer and a resin layer. The battery case 130 includes an upper case and a lower case. In a state in which an electrode assembly (not shown) of a cathode/separator/anode structure is mounted in an electrode assembly receiving part 140 formed in the battery case 130, lateral sides 150b, an upper end 150a, and a lower end 150c of the electrode assembly receiving part 140 are sealed by thermal welding to form a sealing portion 150. In this way, the battery cell 100 is manufactured.

The electrode leads 110 and 120 protrude from the upper end 150a and the lower end 150c, respectively. For this reason, the upper end 150a and the lower end 150c of the upper and lower cases of the battery case 130 are thermally welded to each other, in a state in which a film type sealing member 160 is interposed between the electrode leads 110 and 120 and the battery case 130, in consideration of the thickness of the electrode leads 110 and 120 and the difference in material between the electrode leads 110 and 120 and the battery case 130, so as to increase sealability of the battery case 130.

Figure 3:
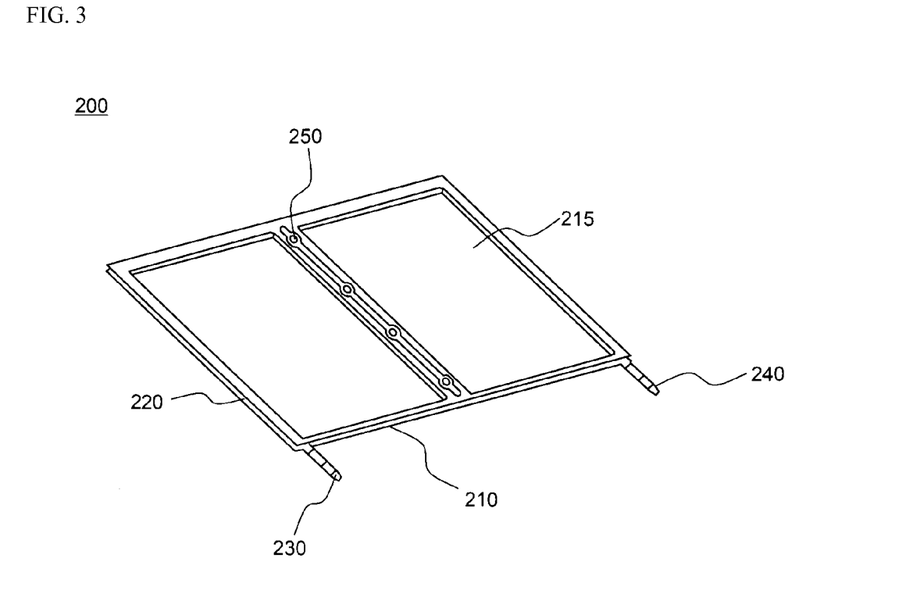
FIG. 3 is a typical view showing a cooling member according to an embodiment of the present invention.
Figure 4:
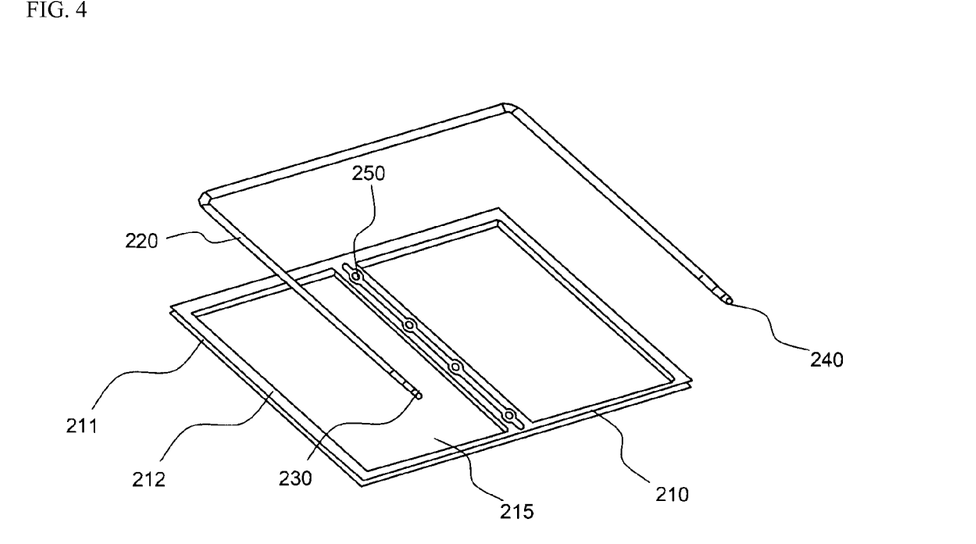
FIG. 4 is an exploded view of the cooling member shown in FIG. 3.
Figure 5:
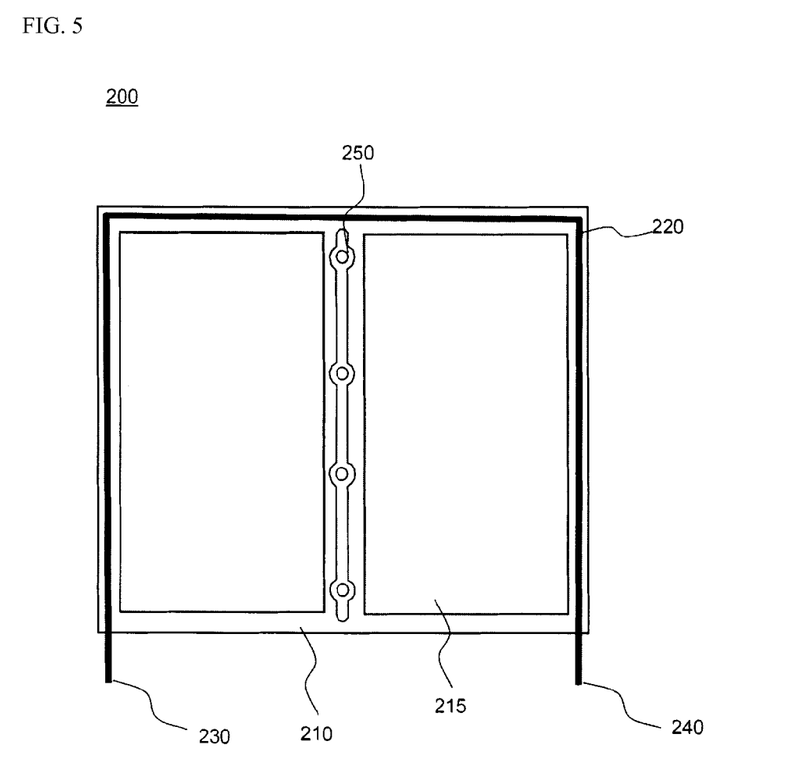
FIG. 5 is a plan view of the cooling member shown in FIG. 3.

FIG. 3 is a perspective view typically showing a cooling member according to an embodiment of the present invention, FIG. 4 is an exploded view typically showing the cooling member of FIG. 3, and FIG. 5 is a plan view typically showing the cooling member of FIG. 3.

Referring to these drawings together with FIG. 2, the cooling member 200 includes a plate-shaped cooling fin 210, which is made of a metallic material, and a coolant conduit 220 located at the outer edge 150 of the electrode assembly receiving part of each of the battery cells 100 and configured to have a hollow structure in which a coolant flows.

The cooling fin 210 is configured to have a structure in which two battery cell contact portions 215 disposed in tight contact with the outer sides of the battery cells in a state in which the cooling fin 210 is disposed between the respective battery cells 100 are continuously formed in the horizontal direction. Also, the cooling fin 210 is provided with four depressed coupling portions 250, which are formed between the battery cell contact portions 215 so that the depressed coupling portions 250 can be coupled to a battery cell mounting frame (not shown). Consequently, the cooling member can be easily mounted to the battery cells.

Also, the coolant conduit 220 is made of a material exhibiting corrosion resistance, and therefore, it is possible to minimize damage to the coolant conduit 220 due to leakage of the coolant.

Figure 6:
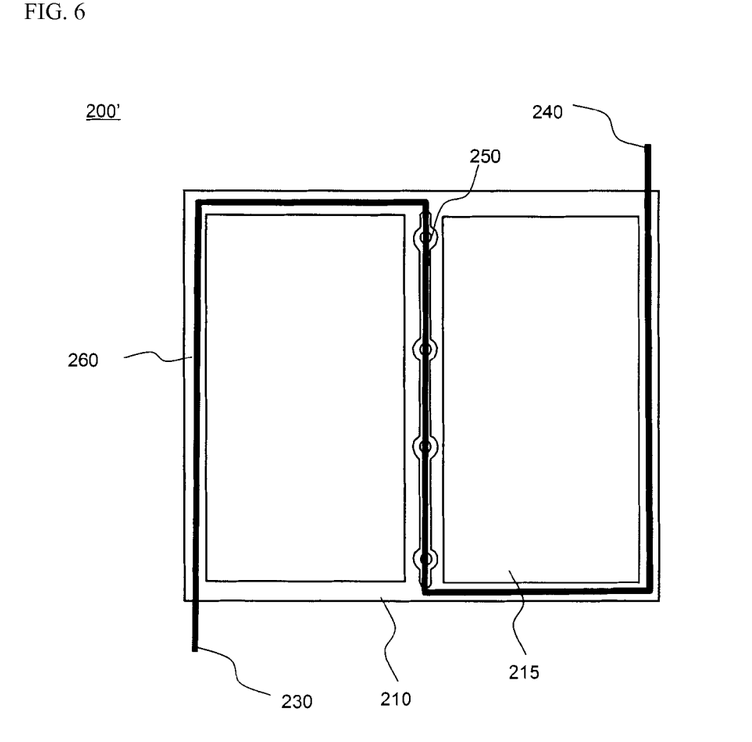
FIG. 6 is a plan view showing a cooling member according to another embodiment of the present invention.

FIG. 6 is a plan view typically showing a cooling member according to another embodiment of the present invention.

A coolant conduit 260 of a cooling member 200' is bent in the shape of 'ㄹ' corresponding to the shape of the outer edges of the battery cell contact portions 215 and is fitted in the cooling fin 210. Consequently, the coolant conduit 260 extends along three sides of the electrode assembly receiving part of each of the battery cells, thereby providing higher cooling efficiency than in the structure of FIG. 5.

Other components of the cooling member are identical in construction to those of the cooling member of FIG. 3, and therefore, a detailed description thereof will be omitted.

Figure 7:
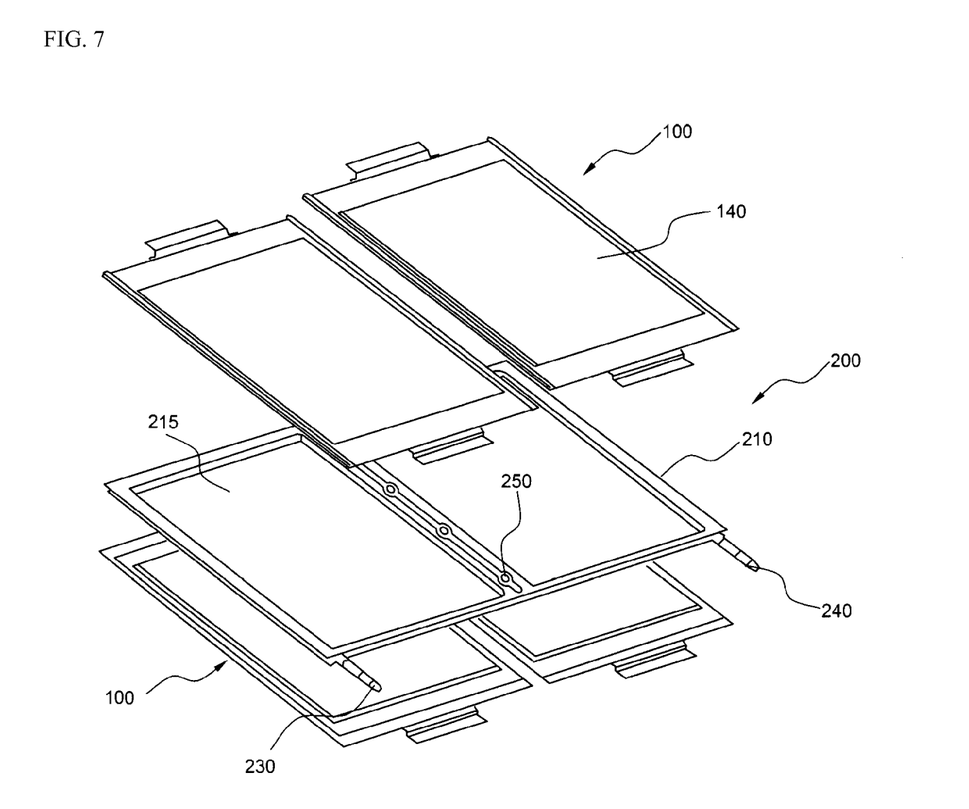
FIG. 7 is an exploded view showing that the cooling member is disposed between battery cells.

FIG. 7 is an exploded view showing that the cooling member is disposed between battery cells.

Referring to FIG. 7 together with FIGS. 2 and 3, the cooling member 200 is disposed between battery cells.

The cooling fin 210 of the cooling member 200 is configured by coupling a pair of metal sheets 211 and 212 by welding 213. The coolant conduit 220 is bent in the shape of 'ㄷ' corresponding to the shape of the outer edges of the battery cell contact portions 215 and is fitted in the cooling fin 210. Consequently, it is possible to prevent the coolant conduit 220 from being clogged or damaged due to stacking of the battery cells. In addition, the number of coolant inlet ports and coolant outlet ports is reduced as compared with the number of battery cells, thereby improving assembly process efficiency of the cooling member.

Figure 8:
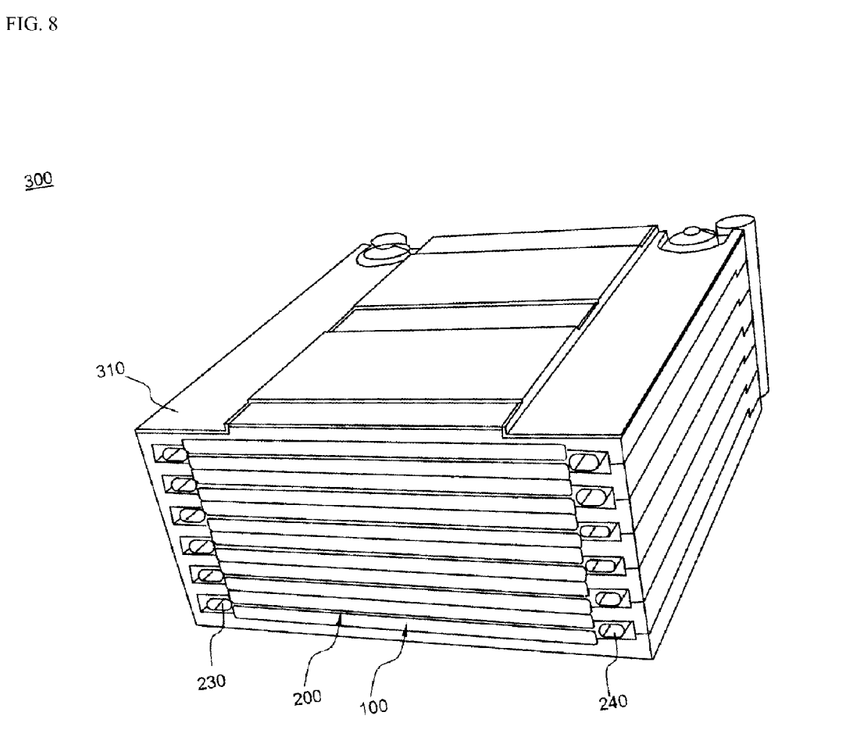
FIG. 8 is a typical view showing a battery module according to an embodiment of the present invention.

FIG. 8 is a typical view showing a battery module according to an embodiment of the present invention.

Referring to FIG. 8 together with FIGS. 3 and 7, a battery module 300 includes a plurality of battery cells 100, a plurality of module cases 310 arranged vertically so that electrode assembly receiving parts 140 of the respective battery cells 100 are adjacent to one another, and a plurality of cooling members 200 disposed at interfaces between the respective battery cells 100.

A coolant inlet port 230 and a coolant outlet port 240 of each of the cooling members 200 disposed between the respective battery cells 100 are directed in the same direction. Consequently, it is possible to easily achieve a piping design for coolant introduction and discharge and to minimize the overall volume of the battery module.

Also, the battery cells 100 are arranged in a state in which the battery cells 100 are mounted in a frame member (not shown), and the frame member is provided with protruding coupling portions (not shown) corresponding to the depressed coupling portions 250 of the cooling member 200. Consequently, the cooling member 200 and the frame member (not shown) can be mechanically coupled to each other.

Accordingly, the coolant, flowing along the coolant conduit 220, effectively removes heat conducted to the cooling fin 210 mounted at the interfaces between the respective battery cells 100 to cool the respective battery cells 100, thereby providing high cooling efficiency. In addition, the battery module 300 is configured so that the battery module 300 has a compact structure although the battery module 300 provides such high cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the cooling member according to the present invention is configured to have a structure in which the coolant conduit, which is formed along the outer edge of the electrode assembly receiving part, is coupled to the cooling fin. Consequently, it is possible to solve a problem of leakage of a coolant while fixing the battery cells during configuration of a battery module. In addition, corrosion resistance to the coolant is required only with respect to a specific component of the cooling member, and therefore, the overall manufacturing costs of the battery module are decreased.

Also, the coolant conduit is disposed along the outer edge of an electrode assembly receiving part in correspondence to the outer edges of two or more electrode assembly contact portions, and therefore, it is possible to easily manufacture a battery module having a more compact structure through a simple manufacturing process.

The invention claimed is:

1. A cooling member mounted between battery cells to remove heat generated from the battery cells during charge and discharge of the battery cells, wherein the cooling member comprises:
   a plate-shaped cooling fin configured to have a structure in which two battery cell contact portions disposed on a same surface of the cooling fin extend in a same plane to be in tight contact with outer sides of the respective battery cells in a state in which the cooling fin is disposed between the respective battery cells; and
   a coolant conduit configured to have a hollow structure in which a coolant flows, the coolant conduit thermally contacting the cooling fin, the coolant conduit being located at an outside of an electrode assembly receiving part of each of the battery cells when the cooling fin is disposed between the battery cells,
   wherein the coolant conduit is configured so that at least a portion of the coolant conduit is bent so as to correspond to the shape of outer edges of the battery cell contact portions,
   wherein, when the electrode assembly receiving part of each of the battery cells is formed in a quadrangular shape in plan, the coolant conduit is bent in the shape of 'C' corresponding to the outer edges of the battery cell contact portions in plan,
   wherein each battery cell includes a pair of major surfaces and four minor surfaces connecting the pair of major surfaces to each other, the pair of major surfaces being of a same size and said size being greater than a size of any of the minor surfaces,
   wherein one major surface of each battery cell contacts a respective battery cell contact portion,
   wherein the coolant conduit is bent so as to be disposed in tight contact with the outer edge of the electrode assembly receiving part,
   wherein the cooling fin is configured to have a structure in which two metal sheets are coupled to each other, and the coolant conduit is coupled to the cooling fin in a state in which the coolant conduit is disposed between the metal sheets, and
   wherein each of the battery cells is a plate-shaped secondary battery.

2. The cooling member according to claim 1, wherein the plate-shaped secondary battery is a pouch-shaped battery cell configured to have a structure in which an electrode assembly of a cathode/separator/anode structure is mounted in a battery case formed of a laminate sheet comprising a resin layer and a metal layer.

3. The cooling member according to claim 1, wherein the cooling fin is formed of a thermally conductive sheet.

4. The cooling member according to claim 1, wherein the coolant conduit is formed of a corrosion-resistant material.

5. The cooling member according to claim 1, wherein the coolant conduit is coupled to the cooling fin by blazing.

6. The cooling member according to claim 1, wherein the cooling fin is provided with one or more depressed coupling portions configured to be coupled to a battery module case or a battery cell mounting frame.

7. The cooling member according to claim 6, wherein the depressed coupling portions are formed between the battery cell contact portions.

8. The cooling member according to claim 1, wherein the coolant is water.

9. A battery module configured to have a structure in which two or more battery cells are arranged in a horizontal direction (a lateral direction) and one or more battery cells are arranged in a vertical direction (a thickness direction) with respect to the battery cells arranged in the horizontal direction, wherein a cooling member according to claim 1 is disposed between the battery cells arranged in the vertical direction.

10. The battery module according to claim 9, wherein the battery cells arranged in the horizontal direction are mounted in a frame member, the cooling member is provided with one or more depressed coupling portions to be coupled to the frame member, and the frame member is provided with one or more protruding coupling portions corresponding to the depressed coupling portions.

11. The battery module according to claim 10, wherein a coolant conduit is configured so that a coolant inlet port and a coolant outlet port of the coolant conduit are formed at a region corresponding to electrode terminals of each of the battery cells.

12. The battery module according to claim 10, wherein a coolant conduit is configured so that a coolant inlet port and a coolant outlet port of the coolant conduit are formed at a region opposite to electrode terminals of each of the battery cells.

13. The battery module according to claim 9, wherein the battery module is used in an electric vehicle, a hybrid electric vehicle, a plug-in hybrid electric vehicle, or a power storage device.

14. A cooling member mounted between battery cells to remove heat generated from the battery cells during charge and discharge of the battery cells, wherein the cooling member comprises:
   a plate-shaped cooling fin configured to have a structure in which two battery cell contact portions disposed on a same surface of the cooling fin extend in a same plane to be in tight contact with outer sides of the respective battery cells in a state in which the cooling fin is disposed between the respective battery cells; and
   a coolant conduit configured to have a hollow structure in which a coolant flows, the coolant conduit thermally contacting the cooling fin, the coolant conduit being located at an outside of an electrode assembly receiving part of each of the battery cells when the cooling fin is disposed between the battery cells,
   wherein the coolant conduit is configured so that at least a portion of the coolant conduit is bent so as to correspond to the shape of outer edges of the battery cell contact portions,
   wherein, when the electrode assembly receiving part of each of the battery cells is formed in a quadrangular shape in plan, the coolant conduit is bent in the shape of 'S' extending between the battery cell contact portions in plan,
   wherein each battery cell includes a pair of major surfaces and four minor surfaces connecting the pair of major surfaces to each other, the pair of major surfaces being of a same size and said size being greater than a size of any of the minor surfaces,
   wherein one major surface of each battery cell contacts a respective battery cell contact portion,
   wherein the coolant conduit is bent so as to be disposed in tight contact with the outer edge of the electrode assembly receiving part,
   wherein the cooling fin is configured to have a structure in which two metal sheets are coupled to each other, and the coolant conduit is coupled to the cooling fin in a state in which the coolant conduit is disposed between the metal sheets, and wherein each of the battery cells is a plate-shaped secondary battery.

15. The cooling member according to claim 14, wherein the coolant conduit is configured so that a coolant inlet port and a coolant outlet port of the coolant conduit are formed at one side of the cooling fin side by side or at opposite sides of the cooling fin.

16. The cooling member according to claim 1, wherein the cooling conduit is disposed outside a perimeter of the electrode receiving part.

17. The cooling member according to claim 14, wherein the cooling conduit is disposed outside a perimeter of the electrode receiving part.

18. The cooling member according to claim 1, wherein the hollow structure is a hollow tubular member.

* * * * *